March 26, 1957    J. J. MACIEJOWSKI    2,786,676
CONTROL SYSTEMS FOR WORK TREATING MACHINES
Filed Aug. 26, 1953    11 Sheets-Sheet 2

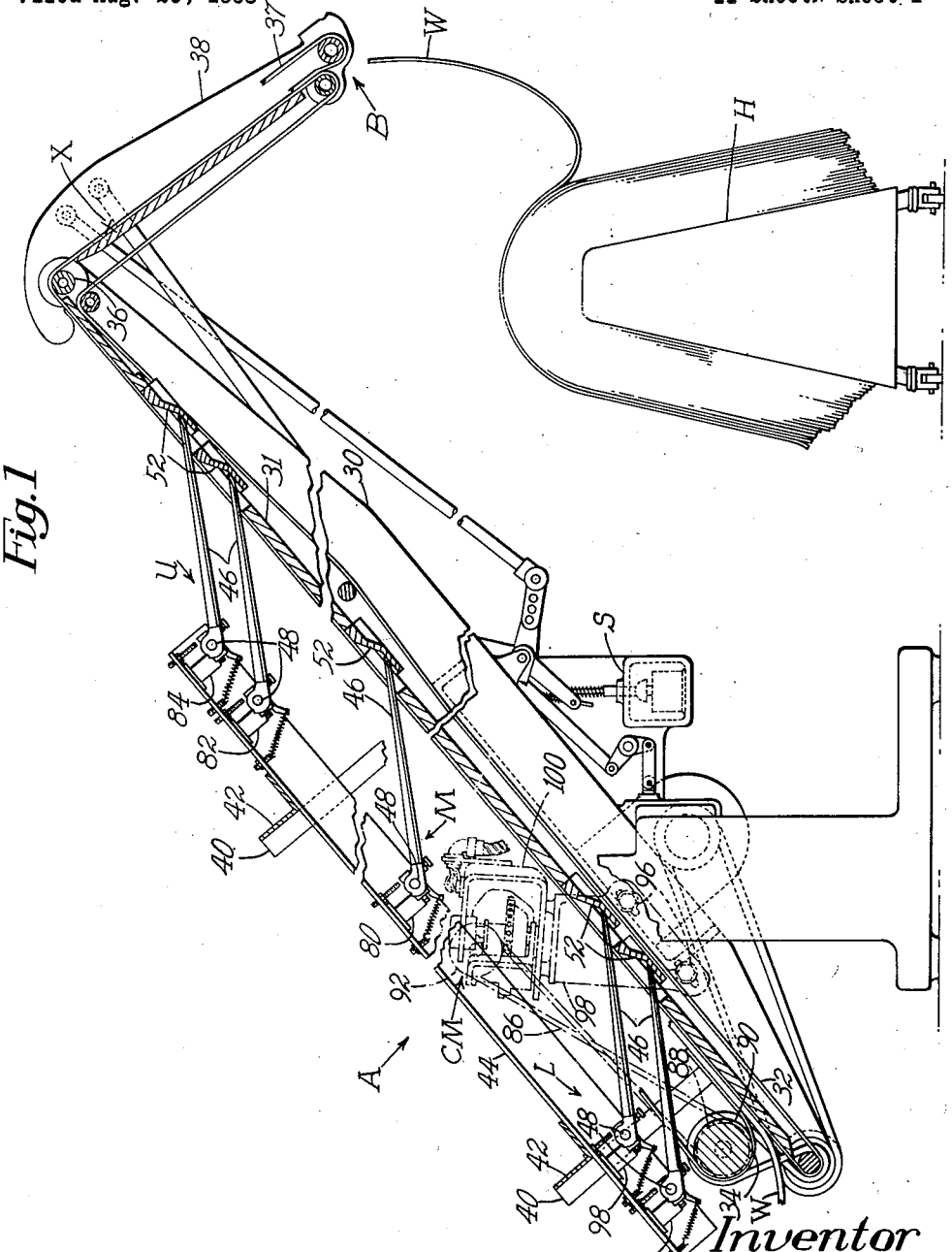

Inventor
John J. Maciejowski
By his Attorney
Thomas J. Ryan

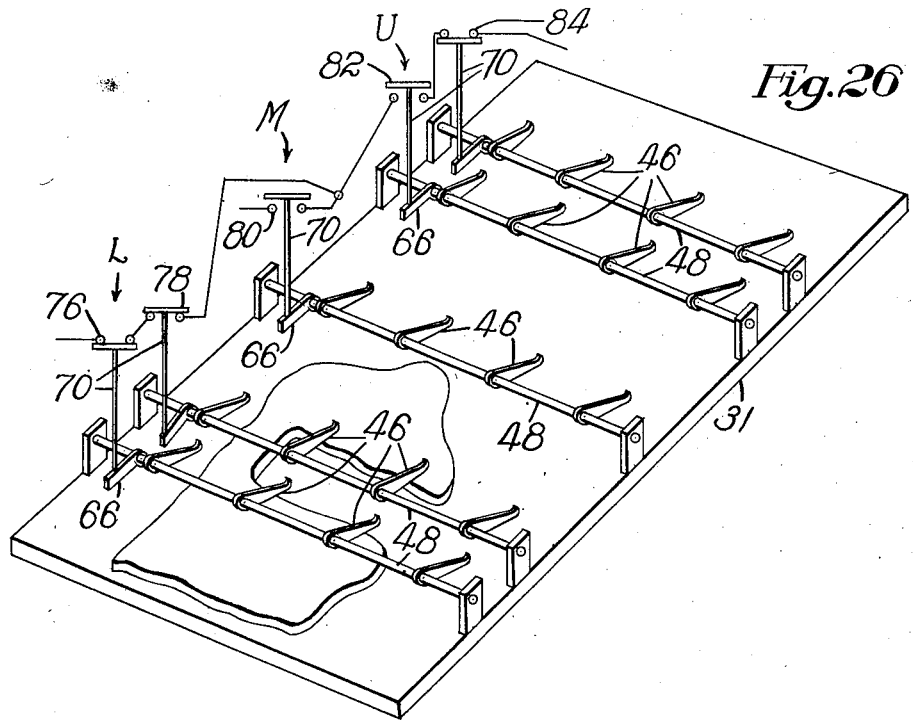
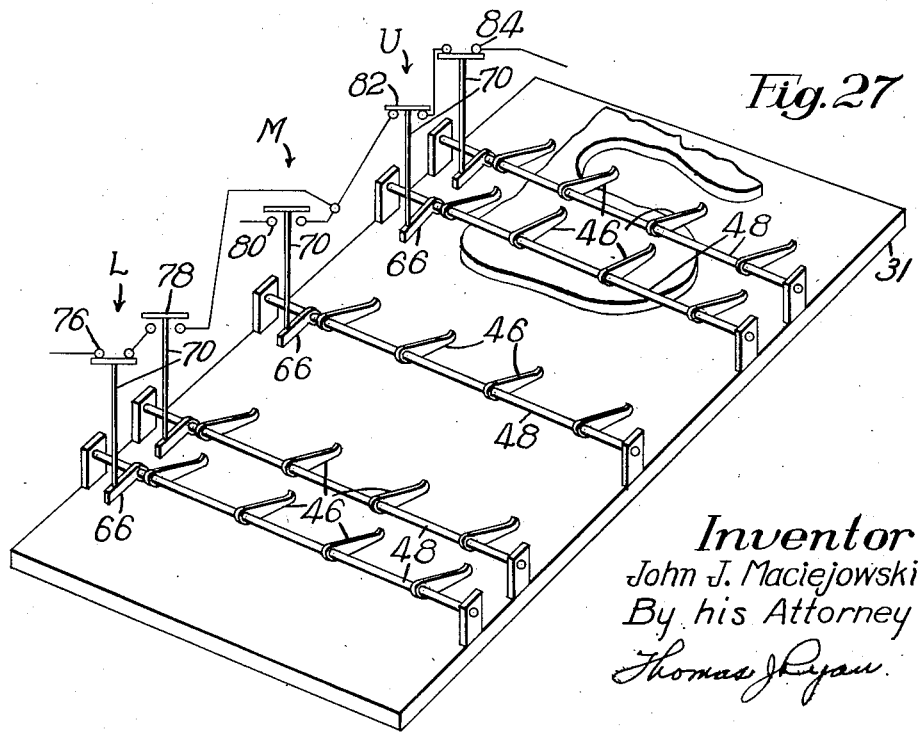

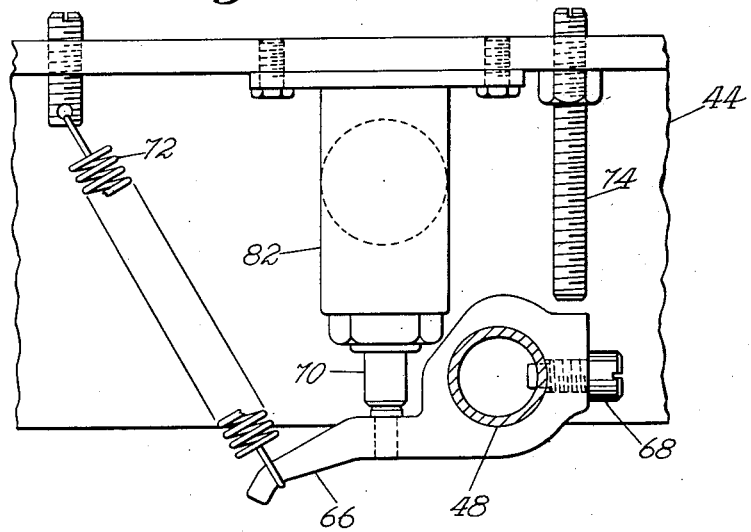
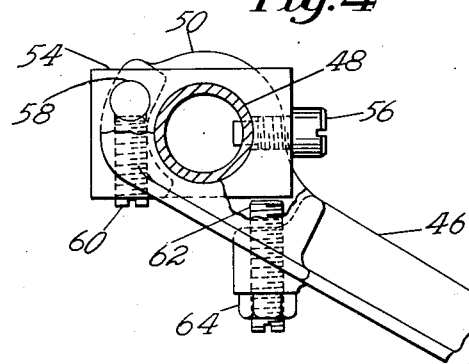
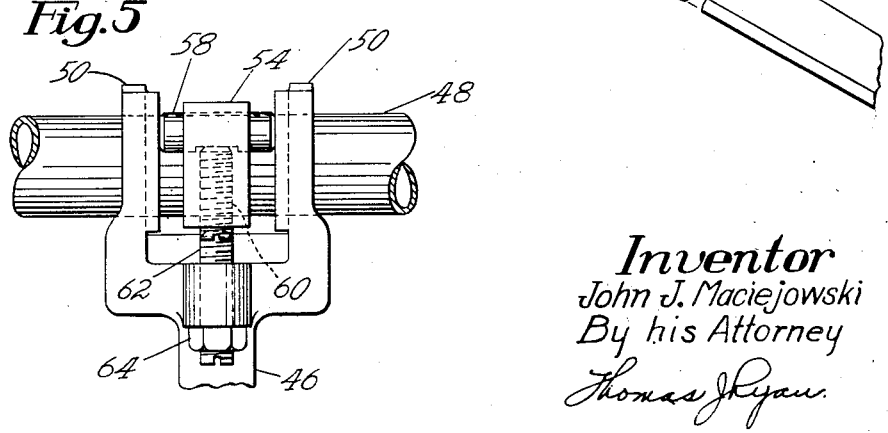

March 26, 1957 J. J. MACIEJOWSKI 2,786,676
CONTROL SYSTEMS FOR WORK TREATING MACHINES
Filed Aug. 26, 1953 11 Sheets-Sheet 6

Inventor
John J. Maciejowski
By his Attorney
Thomas J. Ryan

March 26, 1957 J. J. MACIEJOWSKI 2,786,676
CONTROL SYSTEMS FOR WORK TREATING MACHINES
Filed Aug. 26, 1953 11 Sheets-Sheet 7

*Inventor*
John J. Maciejowski
By his Attorney
Thomas J. Ryan

March 26, 1957  J. J. MACIEJOWSKI  2,786,676
CONTROL SYSTEMS FOR WORK TREATING MACHINES
Filed Aug. 26, 1953  11 Sheets-Sheet 8
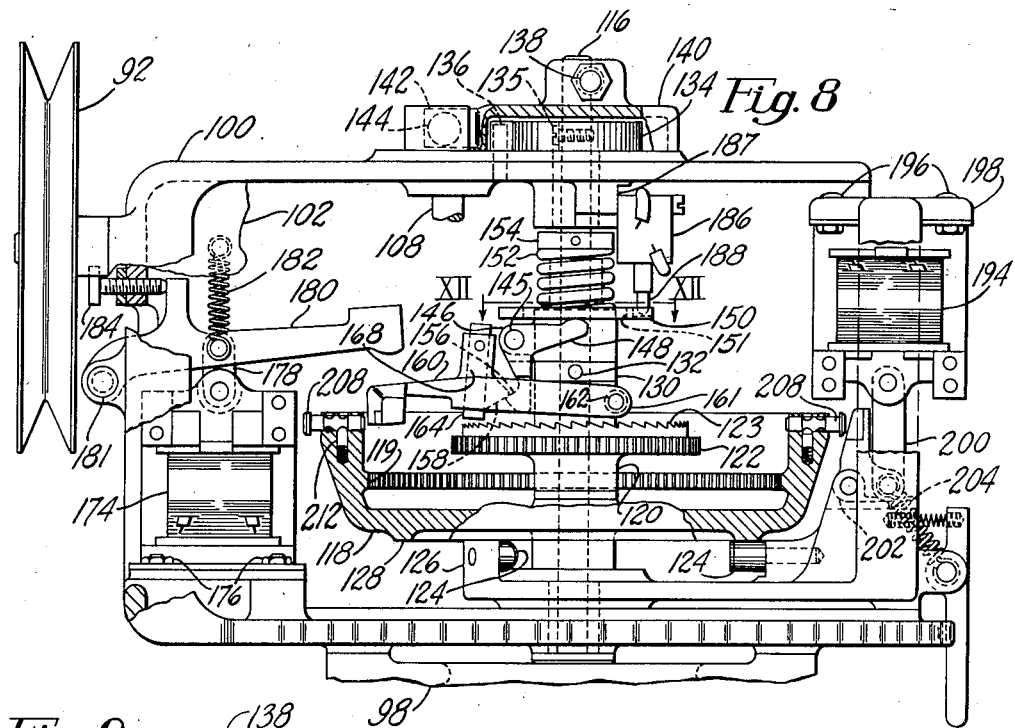
Inventor
John J. Maciejowski
By his Attorney
Thomas J. Ryan

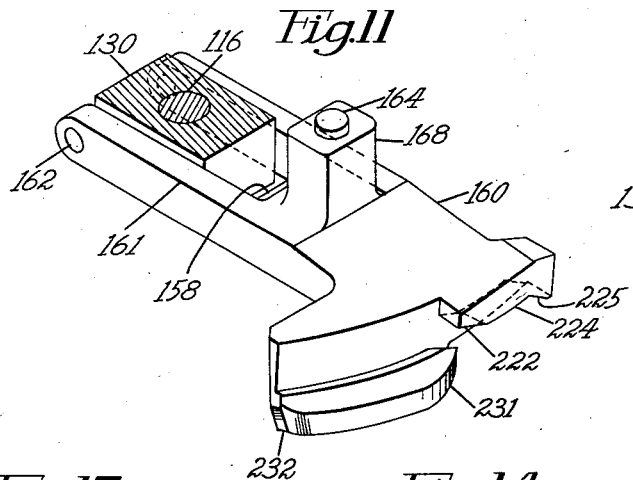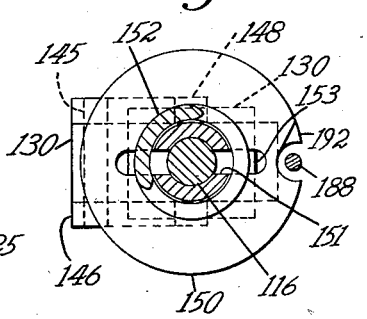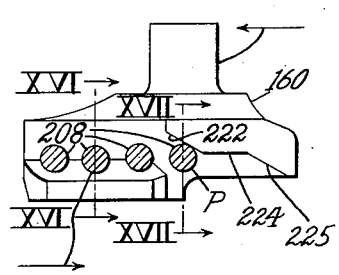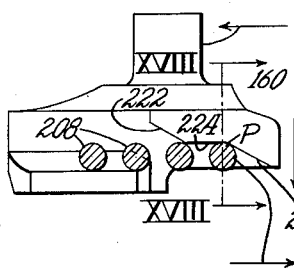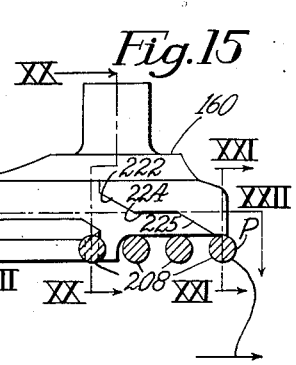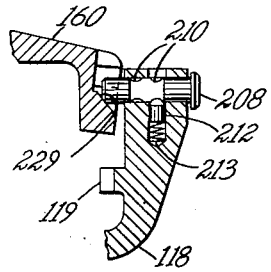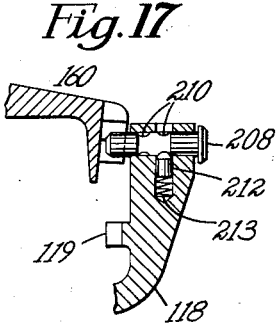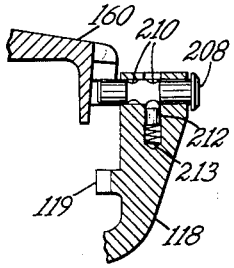

March 26, 1957   J. J. MACIEJOWSKI   2,786,676
CONTROL SYSTEMS FOR WORK TREATING MACHINES
Filed Aug. 26, 1953   11 Sheets-Sheet 10
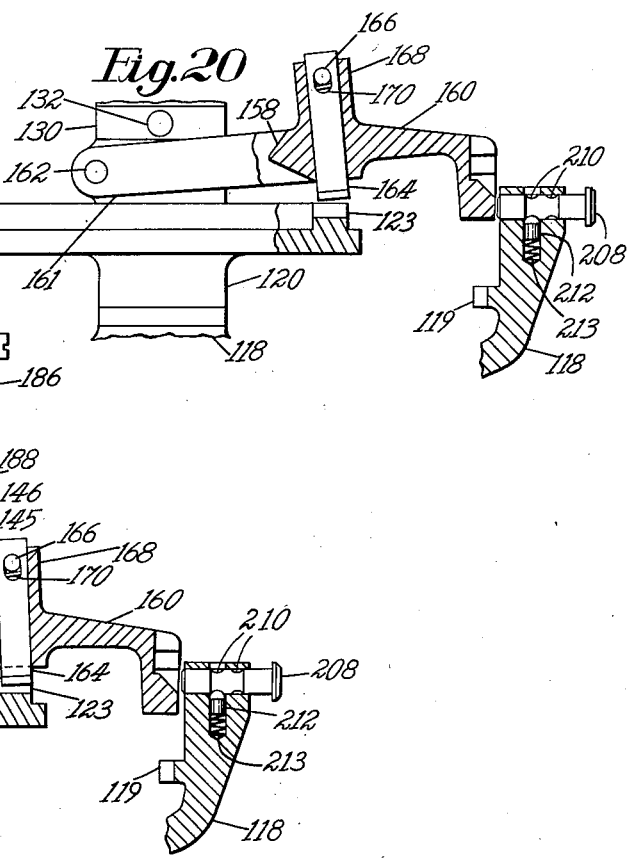
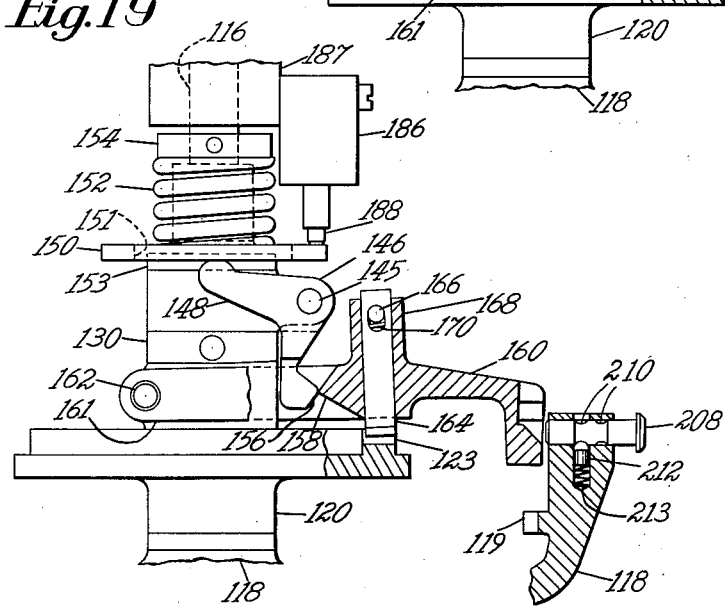
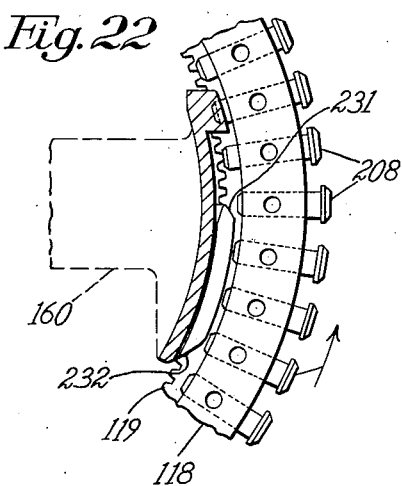
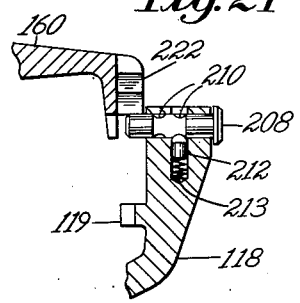
Inventor
John J. Maciejowski
By his Attorney
Thomas J. Ryan.

United States Patent Office 2,786,676
Patented Mar. 26, 1957

2,786,676
CONTROL SYSTEMS FOR WORK TREATING MACHINES

John J. Maciejowski, Wenham, Mass., assignor to United Shoe Machinery Corporation, Flemington, N. J., a corporation of New Jersey Application August 26, 1953, Serial No. 376,623

4 Claims. (Cl. 271—68)

The present invention relates to control systems for automatic work treating machines and more particularly to an improved control mechanism of the type disclosed in United States Letters Patent No. 2,743,924, granted May 1, 1956, in the names of Richard M. Elliott and Edmund S. Lee III, and is herein illustrated in association with an automatic leather stacking machine of the type described in United States Letters Patent No. 2,737,390, granted March 6, 1956, in the names of Paul E. Morgan, Arthur R. Abbott and John J. Maciejowski. However, the present invention is not limited to use with this particular type of machine or leather stacking machines generally.

Control mechanisms of the type disclosed in the above-mentioned Patent No. 2,743,924 are based, briefly, upon the provision of two means for exhausting or varying a condition, said means being operative in response to sensings of upper and lower detector stations spaced apart along the conveyor of a machine which sense the passage of the leading and trailing edges respectively of a conveyed workpiece. The rate of variation of the means responsive to the trailing edge sensing is proportional to the rate of the conveyed workpiece in the same ratio thereto as a fixed portion of the condition is to the distance between the detector stations whereby when said condition has been varied to a predetermined value a selected intermediate portion of the workpiece has arrived at a desired relationship with the upper detector station. Means are then provided for actuating the work treating means which are operative in response to the desired variation of the condition whereby the work treating means are actuated in a desired time relationship to the passage of the workpiece. For further details of these principles of operation reference is made to the above-mentioned Patent No. 2,743,924.

In the mechanical embodiment in this type of control mechanism the work treating means are usually actuated when a switch is closed by the meeting of two members moving in opposite directions. Previously this switch had been mounted on one of said members which must be returned rapidly to its start position after this meeting. The impact forces involved during this meeting and on the return motion unduly shortened the life of the commercially available switches which were used. Furthermore, the time of closure of the switch was practically instantaneous so that the impulse of current which could be transmitted for the activation of the work treating means was not at all times sufficient.

It is an object of this invention to provide an improved control mechanism of the aforementioned type in which the switch for actuating the work treating means is mounted in a fixed position and in which there is provided means for maintaining the switch in a closed position for a finite length of time.

The present invention is illustrated in a mechanical embodiment in association with a leather stacking machine of the type disclosed in the above-mentioned Patent No. 2,737,390 which comprises a conveyor system for carrying workpieces upwardly to a pivot point and then downwardly along a swinging arm. The arm is oscillated when the midpoint of the workpiece arrives at a certain location usually along the swinging arm thereby properly locating the workpiece equally on either side of a work receiving horse. First and second detector stations are spaced apart along said conveyor system for selectively sensing the passage of the leading and trailing edges respectively of a conveyed workpiece. A third or intermediate station is interposed between said stations and is operative in series therewith to prevent the false sensing by either station of an irregularly shaped workpiece. This latter feature is not a subject of the present invention but is claimed in United States Letters Patent No. 2,766,045, granted October 9, 1956, in the names of Paul E. Morgan and John G. Hollick. The control mechanism which is operative in response to the sensings of these stations and which in turn causes the actuation of the swinging arm in proper time relationship to the passage of the workpiece through the machine comprises two coaxial members rotating in opposite directions and at the same rates of speed.

A multiplicity of pins are displaceably mounted in one of said members with their axes lying on radii extending from the axis of said member. Ratchet teeth are formed on the marginal radial face of the other member and a third coaxial member is arranged to be intermittently connected with the toothed member by a yieldably mounted pawl. Means operative in response to one of the upper detector stations are provided for engaging said third member. Means operative in response to the sensing of the other detector sation are provided for displacing one or more of said pins in the path of travel of said third member. A cam surface is formed on said third member which contacts the first of said displaced pins at the time it is desired to actuate the work treating means. The pin acting upon this cam surface causes the third member to rise and close a stationary switch which completes the circuit for the actuation of the work treating means. A flat is provided on this cam surface which causes the switch to be closed for a finite period. The third member continues to be driven after it has been raised due to the action of the yieldably mounted engaging pawl. A further cam surface then fully disengages said third member and other cam surfaces thereon return the displaced pins to their original position during this disengaging motion or as the third member is returned to its start position under the action of a torsion spring.

The above and other features of the invention including various novel details of construction and combinations of parts will now be more particularly described with reference to the accompanying drawings and pointed out in the claims.

In the drawings:

Fig. 1 is a view in side elevation of a leather stacking machine, with certain parts broken away and others shown in section, in which the present control system is incorporated;

Fig. 3 is a view partially in section and on a further enlarged scale taken along the line III—III in Fig. 2 and looking in the direction of the arrows;

Fig. 4 is a view partially in section taken along the line IV—IV in Fig. 2 and looking in the direction of the arrows;

Fig. 5 is a view in elevation of the elements shown in Fig. 4;

Figure 7:
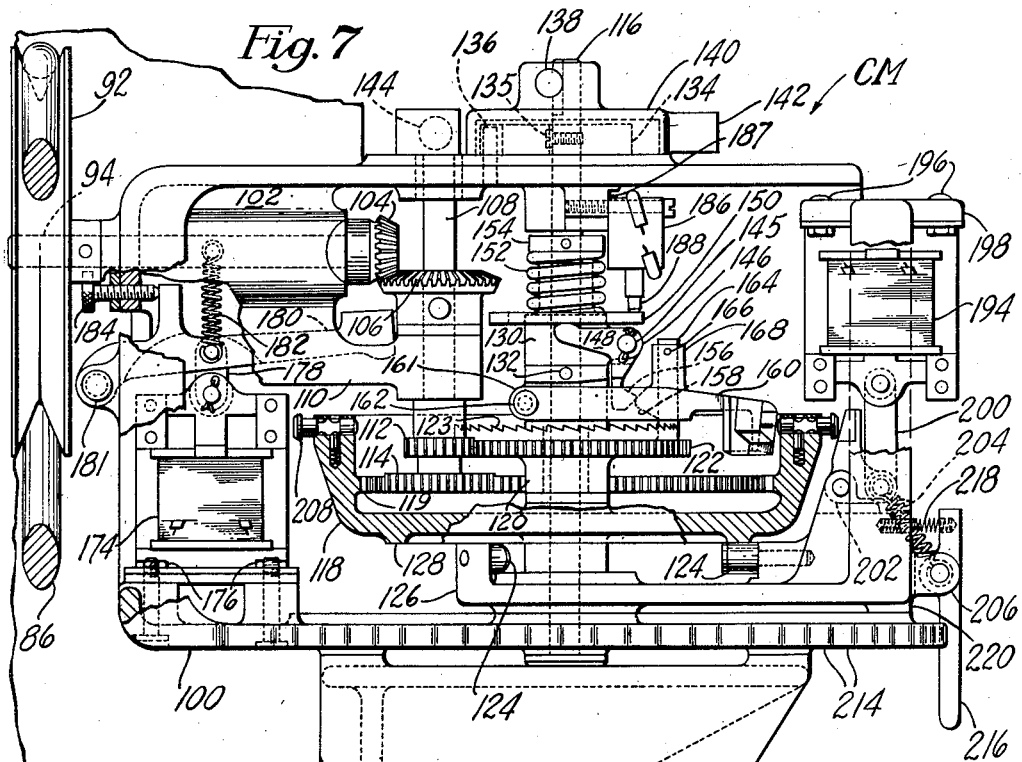
Figure 7A:
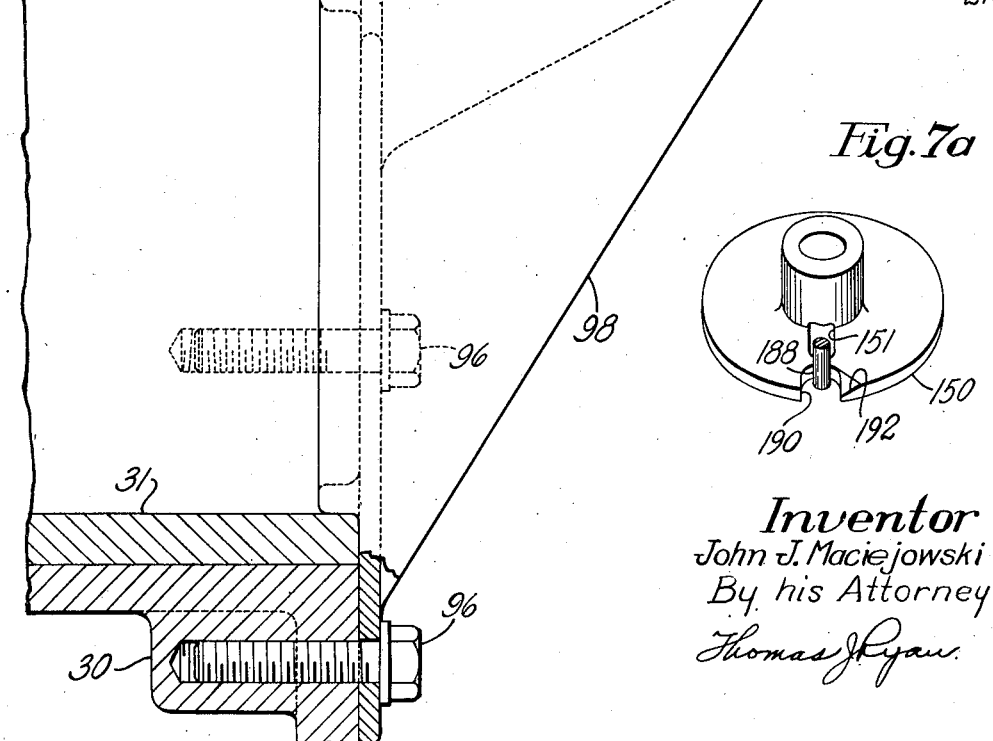
Figure 23:
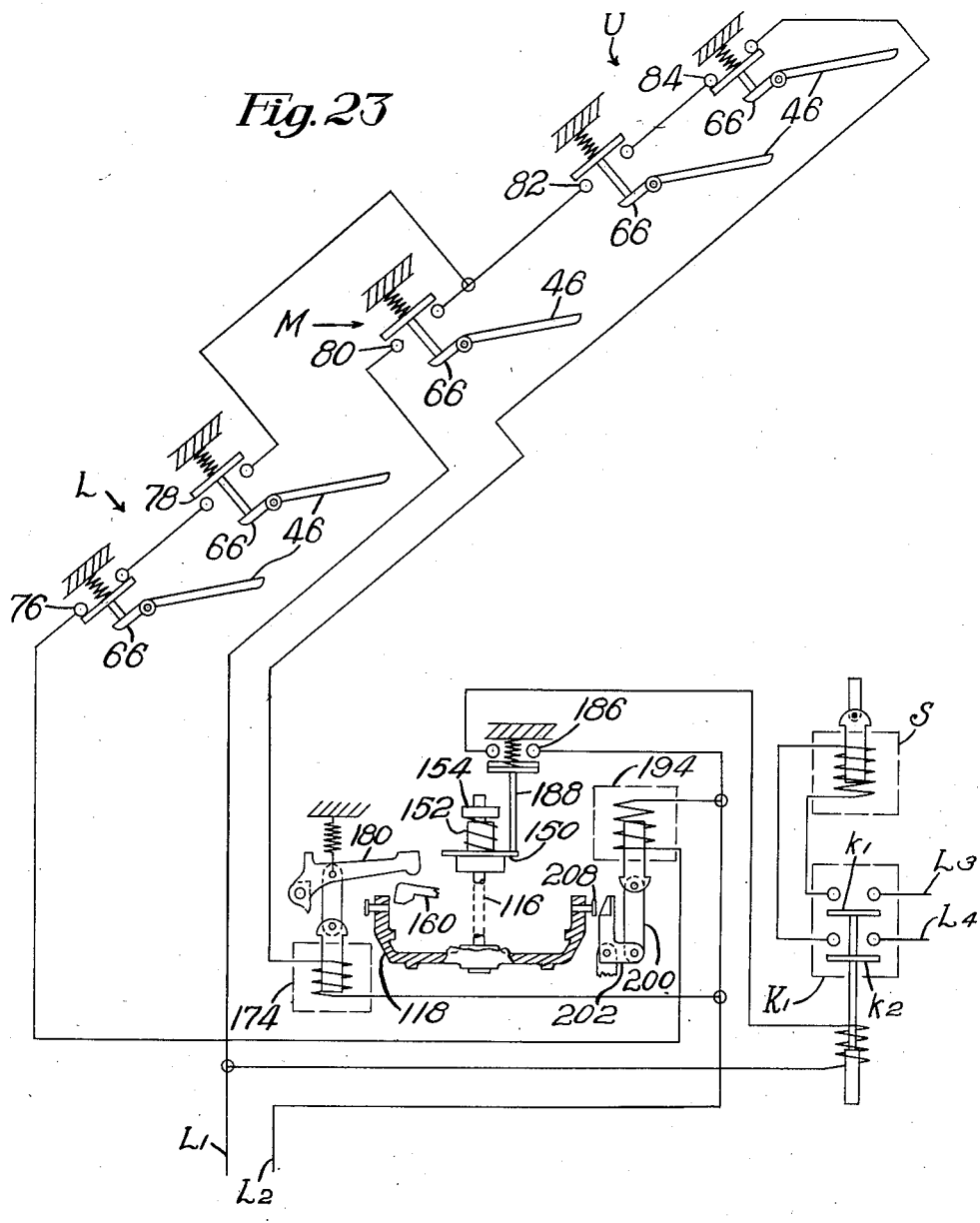

Fig. 7 is a view in front elevation of the control mechanism with certain parts broken away and others shown in section and shown during a cycle of its operation;

Fig. 7a is a view in perspective and on a further enlarged scale of certain elements shown in Fig. 7;

Fig. 8 is a view similar to Fig. 7 with further parts being broken away showing the elements of the mechanism in their rest position;

Fig. 9 is a partial view fully in section of elements shown in Fig. 7 fully in cross section;

Fig. 10 is a view in section on a further enlarged scale taken on the line X—X in Fig. 9 and looking in the direction of the arrows;

Fig. 11 is a view in perspective of one of the operating elements of the mechanism;

Fig. 12 is a view in section taken along the line XII—XII in Fig. 8 and looking in the direction of the arrows;

Figs. 13, 14 and 15 are views partially in section taken along the line XIII—XIII in Fig. 9 and looking in the direction of the arrows showing the relative locations of certain elements during the operation of the mechanism;

Fig. 16 is a view in section taken along the line XVI—XVI in Fig. 13 and looking in the direction of the arrows;

Fig. 17 is a view in section taken along the line XVII—XVII in Fig. 13 and looking in the direction of the arrows;

Fig. 18 is a view in section taken along the line XVIII—XVIII in Fig. 14 and looking in the direction of the arrows;

Fig. 19 is a partial view of the elements shown in Fig. 7 taken when the elements are in the position shown in Fig. 14;

Fig. 20 is a partial view of the elements shown in Fig. 19 taken when they are in the relative position shown in Fig. 15 and along the line XX—XX in that figure;

Fig. 21 is a view in section taken along the line XXI—XXI in Fig. 15 and looking in the direction of the arrows;

Fig. 22 is a view in section taken along the line XXII—XXII in Fig. 15 and looking in the direction of the arrows;

Fig. 23 is a schematical representation of the electrical components of the present invention; and Figs. 24, 25, 26 and 27 are schematical representations of the detector system used herein showing the elements in various stages of operation.

Automatic leather stacking machines of the type in which the present invention is incorporated have a fabricated framework 30 (Fig. 1) and a platform 31 supporting a conveyor system comprising two sets of belts 32, 34 spaced across the width of the machine (Fig. 18) which carry consecutive workpieces W upwardly to a pivot roll 36 where a third set of belts 37 cooperates to carry them downwardly along a swinging arm 38, discharging the workpieces from said arm at an exit portion indicated by the arrow B. The swinging arm 38 is oscillated in time relationship to the passage of the workpiece W so that the workpieces are draped equally on either side of a supporting horse H. It has been found necessary to initiate the oscillatory motion of the arm 38 when the midpoint of the workpiece reaches a point along said arm (conveniently referred to as point X). When the midpoint of any length of workpiece has reached that point, the oscillatory motion is imparted by a hydraulic system the operation of which is initiated by a solenoid S. Reference is made to the above-mentioned Patent No. 2,737,390 for details of construction and operation of the leather stacking machine, except for the operation of the control system for completing the circuit to the solenoid S in proper time relationship to the passage of a workpiece which forms the present invention.

Spaced along the upper surface of the frame 30 are three detector stations L, M and U the lower station L being arranged to detect selectively the trailing edge of a conveyed workpiece and the upper station U selectively to detect the passage of the leading edge of a conveyed workpiece, and the station M being provided to prevent a false detection being made by either the stations L or U where workpieces have holes therein or have so-called hook necks. When the stations L and U detect the trailing and leading edges respectively, electrical impulses are transmitted to a control mechanism CM thereby actuating mechanism therein causing the circuit for the solenoid S to be completed and the arm 38 to be oscillated when the midpoint of the workpiece reaches point X. The general principles of operation of the control mechanism CM are the same as those explained in the above-mentioned Patent No. 2,743,924, and reference is made thereto for a fuller explanation of these principles, which briefly comprise the exhaustion of a quantity, a distance in this case, by two means actuated by the passage of a workpiece and the rate of exhaustion of each means being proportional to the rate of the workpiece.

Figure 2:
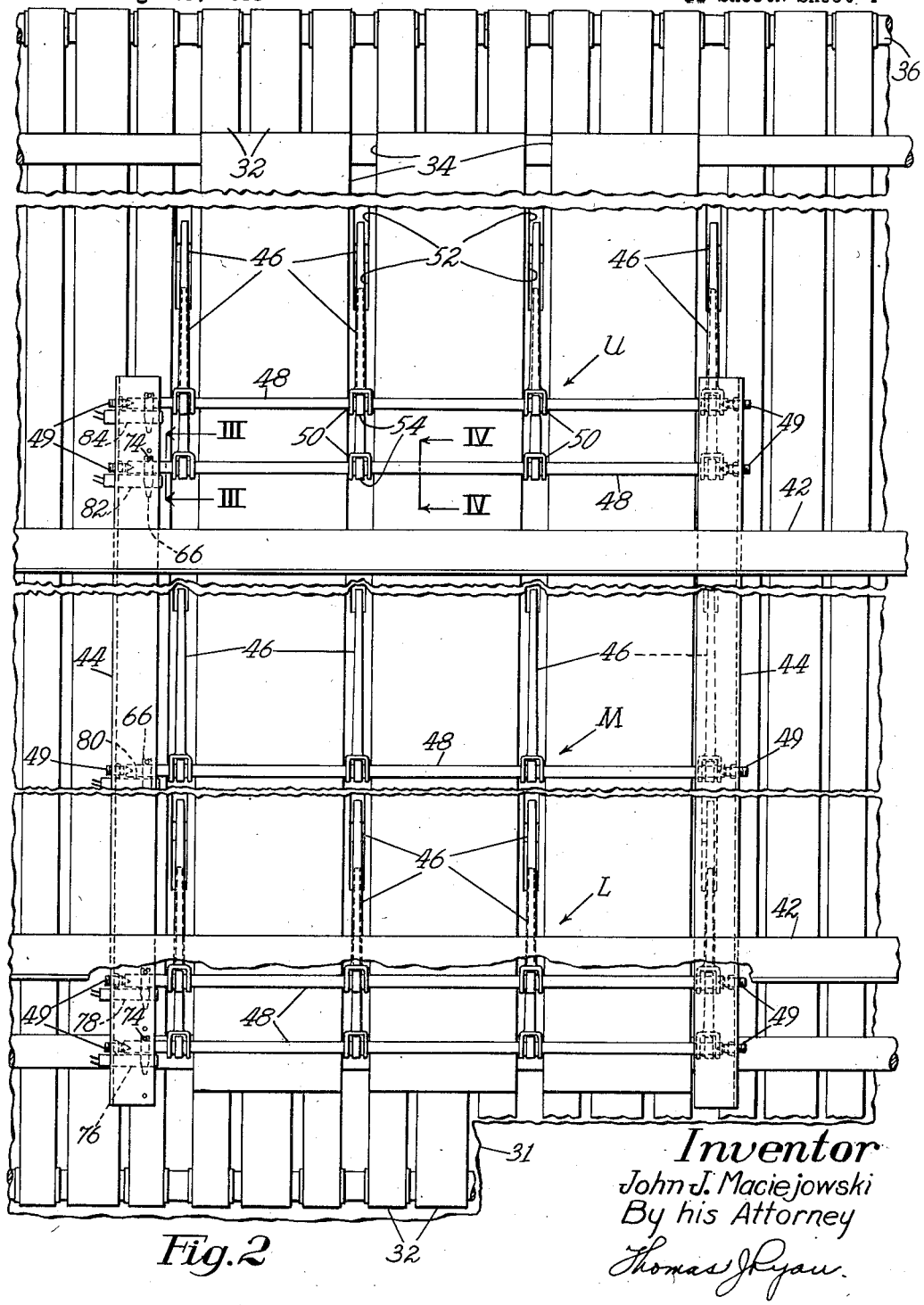
Fig. 2 is a partial view on an enlarged scale of the leather stacking machine and detector stations taken in the direction of the arrow A in Fig. 1.

The stations L, M and U are supported on the conveyor frame in the following manner. Members 40 are secured to the sides of the frame 30 and normal to the platform 31. An angle member 42 extends between each member 40 and a second pair of angle members 44 are secured to the members 42 (Figs. 1 and 2).

Each detector station comprises fingers 46 (Figs. 4 and 5 illustrating a representative finger), and each finger 46 is pivotally mounted upon a hollow shaft 48 by ears 50 integral with the finger. Each shaft 48 extends transversely across the machine and is freely mounted on pivot screws 49 threaded into each angular member 44 (Fig. 2). The body of each finger is of T cross section and tapers towards its lower end which lies in a recess 52 formed in the platform 31. A block 54 is provided between each of the ears 50 and is held in non-rotatable relation to the shaft 48 by a dog screw 56. A pin 58 passes through the block 54 and bears against the inside of each ear 50. Thus when the position of the block 54 is established by the dog screw 56, the finger 46 may be adjusted laterally so that its lower end will align properly with the recess 52 this position being maintained by tightening a screw 60 threaded in the block 54. A screw 62 is threaded into the body of the detector finger 46 and extends just short of the bottom of the block 54 and is held in that position by a check nut 64. It is evident that when the finger 46 is lifted as by the passage of a workpiece the screw 62 will strike the block 54 thereby imparting a rotational movement to the shaft 48 but that rotational movement of the shaft 48 will not impart any motion to the finger 46. At the left-hand end of each shaft 48 an arm 66 is secured by a dog screw 68 which maintains a switch button 70 in its depressed position through the yieldable action of the spring 72 which overcomes the internal spring pressure of the switch. With this arrangement a minimum force is required to lift any finger 46 to rotate the shaft 48 thereby allowing the switch button 70 to assume its normal position under the action of the internal spring thereby making or breaking a contact in said switch. A stop screw 74 is threaded into the angle member 44 and is arranged to bear against a portion of the arm 66 thus limiting the rotational movement of the fingers 46 which are lowermost in a pair. In this manner it is possible to limit the upward movement of the fingers and prevent them from becoming fouled when a curled workpiece passes through the machine.

The lower station L comprises four pairs of fingers 46 (Figs. 1 and 2) arranged to operate switches 76, 78. The middle detector station M comprises four fingers 46 arranged to operate the switch 80 while the upper detector station comprises four pairs of fingers 46 arranged to operate switches 82, 84. The electrical circuits controlled by these switches will be described below. The arrangement of the detector fingers and the circuits controlled thereby is not claimed herein but is the subject of the aforementioned Patent No. 2,766,045.

The control mechanism CM is secured to the right-hand side of the frame 30. Two screws 96 support a bracket 98 against the side of the frame 30 and the main frame 100 of the control mechanism CM is fastened to the top of said bracket (Figs. 1 and 7). Power is supplied to this control mechanism by a belt 86 connecting a pulley 88 secured to a driven conveyor belt roll 90 and a pulley 92 secured to a shaft 94 of said control mechanism, the shaft 94 thus being continuously rotated. The shaft 94 is journaled in a lug 102 formed on the frame 100 and a beveled gear 104 is secured on its inner end which meshes with a second beveled gear 106 secured to a vertical shaft 108. The shaft 108 is journaled in the frame 100 and in an extension 110 of the lug 102 on its lower end portion two gears 112, 114 are secured. A vertical shaft 116 arranged parallel to the shaft 108 is journaled in upper and lower portions of the frame 100. A cup-shaped member 118 is rotatably mounted upon said shaft and has an annular gear 119 which meshes with the gear 114. A member 120 is likewise freely mounted on the shaft 116 and has formed integral therewith a gear 122 which meshes with the gear 112. Ratchet teeth 123 are formed on the upper radial face of the member 120. It will be seen that the cup-shaped member 118 and the member 120 are being constantly driven in opposite directions of rotation and that the arrangement of the gearing is such that they are traveling at equal rates of speed. Three rolls 124 are mounted on a bracket 126 which is also rotatably mounted on the shaft 116. The rolls 124 bear against a surface 128 formed on the member 118 thereby providing adequate bearing support for said member. A collar 130 (Fig. 9) is secured to the shaft 116 by a pin 132 and bears against the upper surface of the member 120. One end of a spiral torsion spring 134 is secured to the upper end of the shaft 116 by a screw 135. The other end of said spring is secured to a pin 136 inserted in the frame 100. Also attached to the upper end of the shaft 116 by a binding screw 138 is a cup-shaped member 140 having a lug 142 arranged to bear against a resilient pad 144 secured to the upper surface of the frame 100 under the action of the spring 134.

Pivotally connected to the collar 130 on a pin 145 is an angular member 146 having a bifurcated section 148 extending on either side of said collar and bearing against the underside of a flanged collar 150 which is slidably mounted on the shaft 116 (Figs. 8 and 12). Said flanged member has a slot 151 formed on its lower portion which receives corresponding lugs 153 formed on the collar 130. Thus the flanged member 150 rotates with the collar 130 while it may also move axially thereto. A collar 154 is pinned to the shaft 116 and a spring 152 acting between it and the upper surface of the flange maintains the member 150 and the angular member 146 in their downward positions, the downward position of the member 150 being limited by the collar 130. On the lower portion of the member 146 a tooth 156 is formed which when the mechanism is in its rest position (Fig. 8) bears against the underside of a corresponding tooth 158 formed on a timing arm 160 (Figs. 8 and 11), a bifurcated section 161 of which is pivotally connected to the collar 130 at 162.

A toothed pin or pawl 164 having the same form as the teeth 123 is yieldably mounted in the arm 160 (Fig. 10). Rotational movement of the member 164 is prevented by a pin 166 extending through a boss 168 formed on the arm 160 and extending through a slot 170 formed in the pawl 164. A compression spring 172 normally holds said member in a downward position which is limited by the slot 170.

An arm-engaging solenoid 174 is mounted by four screws 176 (Figs. 6 and 8), only two of which are seen, to lugs on the frame 100. A link 178 pivotally connects the solenoid plunger to an arm-engaging lever 180 pivotally connected to the frame 100 by a pin 181 which is normally held in its upper position by a tension spring 182, its upper position being limited by the stop screw 184.

It can be seen (Fig. 6) that the angular position of the arm 160 is controlled by the lug 142 bearing against the resilient pad 144 under the action of the spring 134. In this position the arm 160 is located immediately beneath the lever 180. Upon activation of the solenoid 174 the lever 180 causes the arm 160 to be pivoted downwardly around the pivot point 162. During this motion the spring 172 is compressed and the pawl 164 is brought into engagement with the rotating member 120. Also during this downward movement of the arm 160 the member 146 is pivoted in a counterclockwise direction as viewed in Fig. 8 by the camming action of the teeth 158, 156. By this rotational movement the flanged member 150 is raised compressing the spring 152. Continued downward motion of the arm 160 causes the tooth 156 formed on the member 146 to bear against the upper surface of the corresponding tooth 158. Thus the arm 160 is held in positive engagement with the member 120 by the spring 152 which also maintains the spring 172 in a compressed condition.

A microswitch 186 is mounted on a projection 187 of the frame 100 with its plunger 188 extending into a slot 190 (Fig. 7a) formed on the flanged member 150. The flanged member 150 which is arranged to rotate with the collar 130 is so oriented that when the arm 160 is in its start position as shown in Fig. 8 the slot 190 is beneath the plunger 188. When the arm 160 is engaged with the member 120 and the angular member 146 rotates lifting the flanged member 150 the plunger 188 will not be depressed. As the arm 160 begins its motion, the plunger 188 is raised by a camming surface 192 (Fig. 7a). The plunger then rides on the upper surface of the flanged member 150 but has not been raised sufficiently to close the contacts of the microswitch 186.

Figure 6:
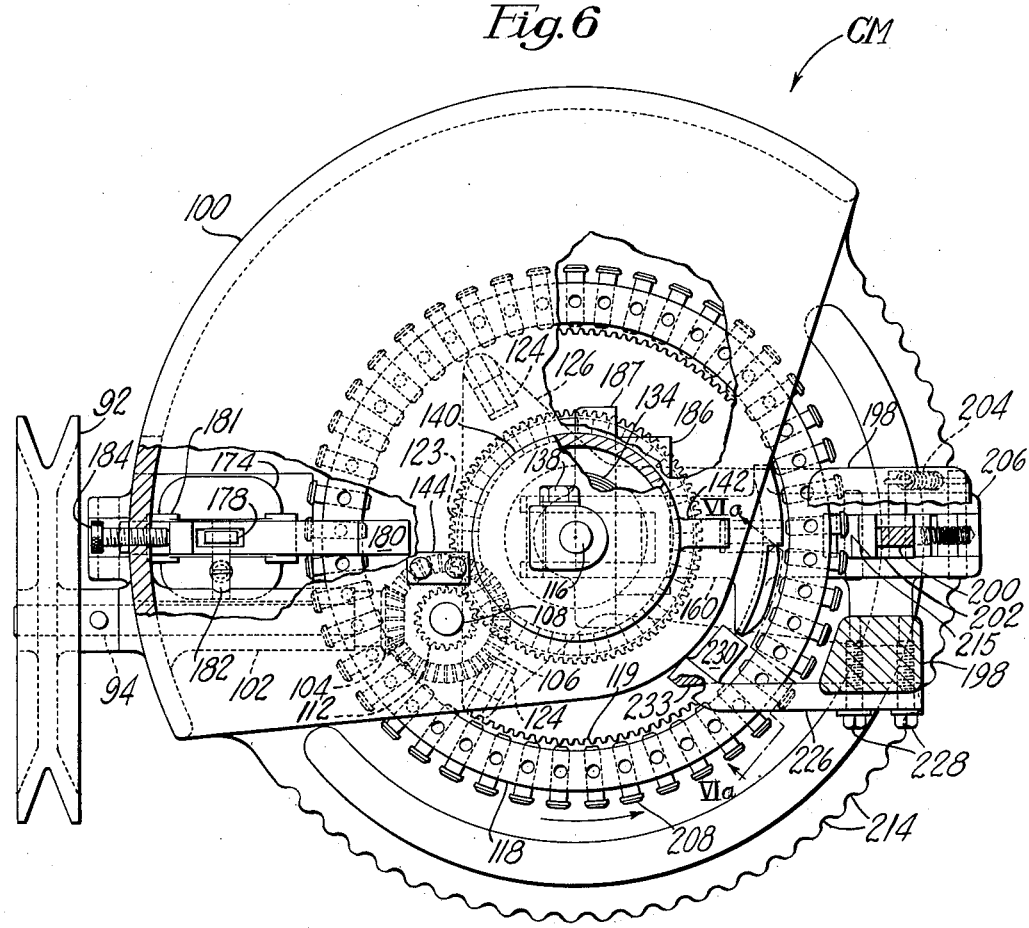
Fig. 6 is a plan view on an enlarged scale of the control mechanism shown in phantom in Fig. 1.

A pin punching solenoid 194 is mounted by four screws 196 to the bottom surface of an inverted L-shaped projection 198 extending from the bracket 126 (Figs. 6, 7 and 8). A link 200 extending from the plunger of the solenoid 194 is pivotally connected to a bifurcated end of a bell crank 202 which is in turn pivotally connected to the bracket 126. The plunger and link 200 are normally held in their downward position by a tension spring 204 connected between the bell crank 202 and a lug 206 formed on the bracket 126. A multiplicity of headed pins 208 are slidably mounted in the upper portion of the cup-shaped member 118 arranged at spaced intervals with their axes extending radially of the center of said cup-shaped member (Fig. 6). Each pin 208 has two grooves 210 which are arranged alternately to receive a rounded plunger 212 which is yieldingly pressed therein by a spring 213 (Fig. 16). The pins are normally in the position shown in Fig. 8 with the plunger engaging the innermost groove. The upper end of the bell crank 202 is arranged adjacent to the path of travel of the pins 208. Upon activation of the solenoid 194 the bell crank 202 rotates in a counterclockwise direction as viewed in Fig. 8, engaging the pins 208 and displacing them inwardly so long as the solenoid 194 is activated, the camming surface 215 on the upper end of the bell crank (Fig. 6) preventing jamming of the pins. The pins 208 are held in this displaced position by the plunger 212 resting in the outermost groove 210.

The angular position of the pin punching solenoid 194 and the bracket 126 is adjustable in the following manner for reasons which will be described presently. A series of notches 214 is formed around the periphery of the lower wall of the frame 100. A lever 216 is pivotally connected to the lug 206 on the bracket 126 and is held in engagement with one of said notches 214 by a compression spring 218. When it is desired to change the position of the solenoid 194 an operator manually disengages the lever 216 and rotates the bracket 126 about the shaft 116. A lug 220 formed on the bracket 126 bears against the frame 100 providing an outboard support for said bracket.

Figure 6A:
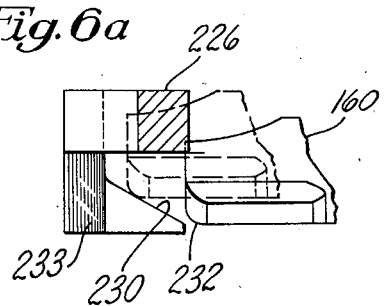
Fig. 6a is a view taken on the line VIa—VIa in Fig. 6 on a further enlarged scale showing the operating relationship of certain elements shown.

Extending above the cup-shaped member 118 is a safety arm 226 which is secured to the upright portion of the projection 198 by two bolts 228 (Fig. 6). A camming surface 230 is formed on the other end of the arm 226 which extends beneath the upper surface of the member 118 and into the path of travel of the timing arm 160 and is adapted to engage a corner portion 232 thereof (Fig. 6a) for purposes to be described shortly.

The electrical circuit used herein is relatively simple utilizing standard electrical components of well known character and is diagrammatically depicted in Fig. 23. Power is supplied from the main lines L1, L2. One circuit flows from the line L1 through the switches 80, 78 and 76 through coil of the pin punching solenoid 194 and then back to the line L2. A second circuit is arranged to flow from the line L1 through the switches 80, 82 and 84 through the coil of the arm-engaging solenoid 174 and then back to the line L2. A third circuit is arranged to flow from the line L1 through the coil of a relay K1 through the switch 186 and back to the line L2. A fourth circuit is arranged to flow from the line L3 through the contractors $k1$ to the coil of the solenoid S and the contractors $k2$ to the line L4.

As was previously stated the operation of the present timing device is based upon the principles of operation disclosed in the above-mentioned Patent No. 2,743,924.

Briefly, the mentioned principles comprise the variation of a quantity by two elements actuated independently by the sensings of selected detector stations along a conveyor system which determine the passage of the leading and trailing edges of a conveyed workpiece, the rate of the element actuated by the trailing edge detector station being in the same ratio to the rate of the conveyed workpiece as a fixed amount of the quantity is to the distance between the detector stations whereby when the quantity has been varied to a fixed amount a selected intermediate portion of the workpiece has arrived at a fixed point in relation to the machine. In the present case the angular distance between the starting position of the arm 160 and the pin pushing bell crank 202 represents that quantity. The pulley and gearing arrangement is such that both a displaced pin and the arm, when engaged, will move at a rate in the above designated ratio to vary or exhaust the distance between them. When the pin and the arm meet then the midpoint of the workpiece is at a fixed point in relation to the machine dependent on the angular adjustment of the bracket 126 through the range indicated by the notches 214. The arm and the pins are traveling in a fixed ratio to the movement of the workpiece and because their driving means are connected directly to the conveyor drive by the belt 86 this ratio will be maintained at all times. If the quantity to be varied were repreesnted by some other condition, the features of this invention would apply if the varying means were made directly dependent on the conveyor means.

Figure 24:
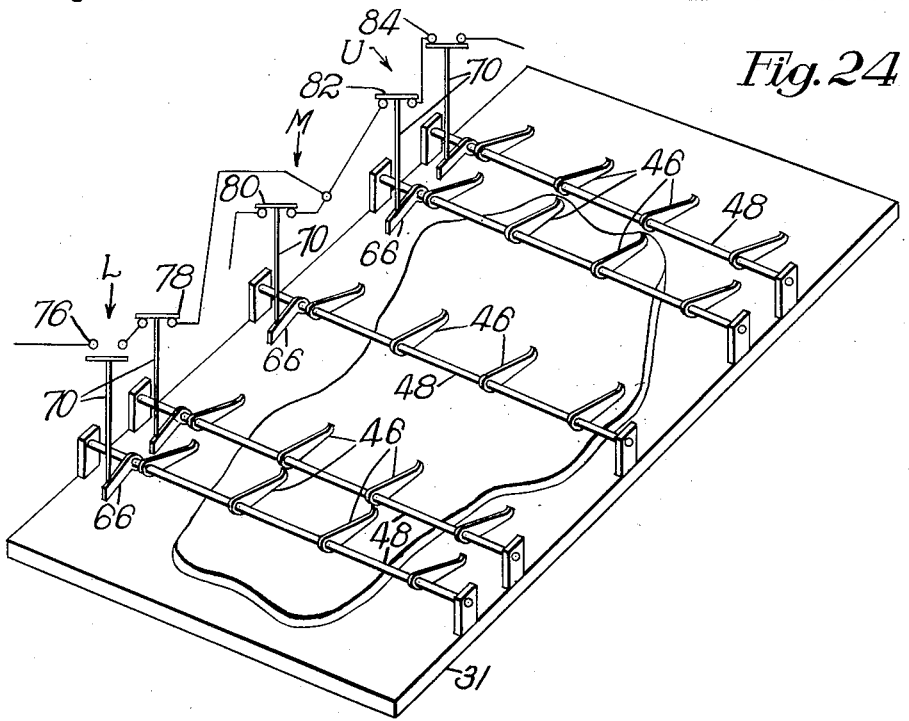
Figure 25:
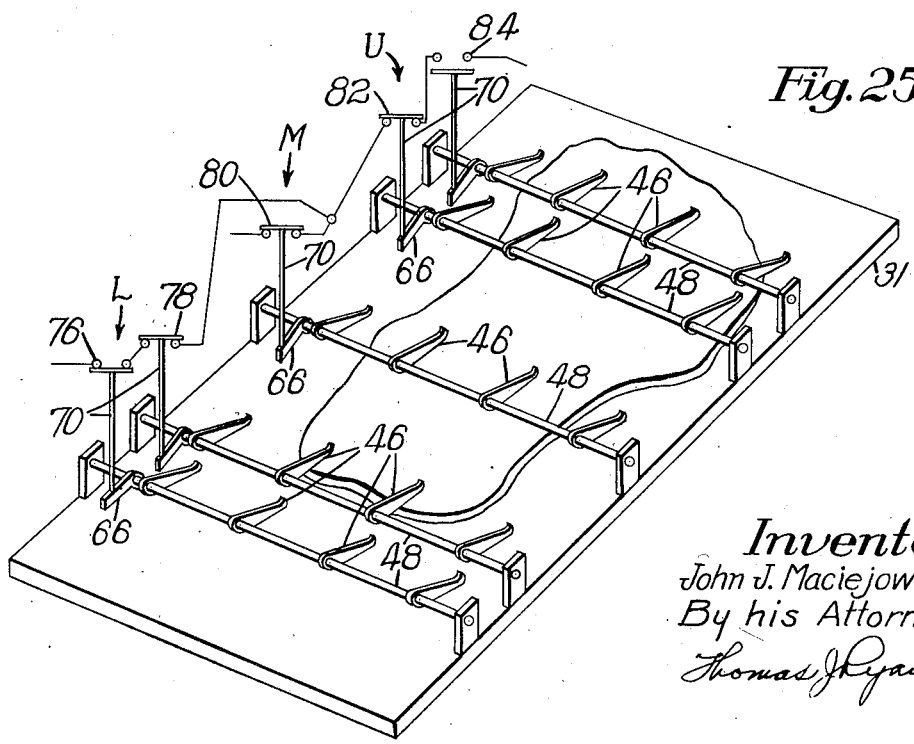

The following arrangement has been provided in order to overcome the false cycling which will be obtained particularly by so-called hook necked workpieces, that is workpieces or hides which have slots formed therein caused during the butchering of the animal. This type of workpiece is represented in Fig. 26. The leading large portion of the workpiece represents the head of an animal. The slot formed therein has been caused during the butchering of the animal. The lower detector station L is arranged to sense the passage of a trailing edge in a manner to be described shortly. As can be seen in Fig. 26, if a workpiece were presented to the machine it would appear to the detectors of the lower station L that an independent workpiece had passed by, since the narrow section of leather can be easily passed between the spaced fingers. Therefore all of the lower fingers will be in a downward position as they would be when the trailing edge of a workpiece has gone by. Similarly as can be seen in Fig. 27 all of the uppermost fingers of the station U are in a downward position indicating the passage of a leading edge when in fact a second workpiece has not yet been presented. To overcome this problem the detector station M has been provided. Referring now to Fig. 24 it will be seen that a workpiece of normal configuration is passing up the conveyor slope. When the leading edge of the workpiece arrives at the upper station U one or more of the lower fingers 46 will be raised momentarily closing the circuit flowing through the switches 84, 82 and 80. A short time thereafter the upper fingers of the station U will be raised opening the switch 84 and breaking said circuit. A short pulse of current may at that time flow through the circuit giving an indication of the passage of the leading edge. It will be noted that the switch 80 is closed because the body of the workpiece is beneath the finger of the station M. In Fig. 25 the operation of the lower station L is illustrated. As the workpiece W is conveyed along the conveyor, the lower set of fingers of the station L drop off of the rear edge of the workpiece closing the switch 76 allowing the circuit flowing through the switches 76, 78 and 80 to be completed momentarily. A short time thereafter the switch 78 is opened when the trailing edge passes beyond the upper fingers of the station L. This momentary completion of the detection circuit gives an indication or sensing as to the time when the trailing edge passes the lower station L. It will again be noted that the main portion of the workpiece is beneath the station M thereby closing the switch.

Referring now to Figs. 26 and 27 it is evident that even though the switches of the stations L and U may assume the same relation as when the leading or trailing edge of a workpiece passes up the conveyor as seen in Figs. 23 and 24 neither circuit may be completed through the respective switches 76, 78 and 80 or 80, 82 and 84 because in each instance the main portion of the workpiece is not beneath the station M and in both instances the switch 80 is opened. This of course limits the maximum length of workpiece to the distance between the stations L and M or M and U. However, the problem of hooked necks exists mainly in large workpieces and if it is desired to operate the machine for smaller workpieces the switch 80 may be physically locked in a closed position. The stations L and U would then selectively detect the leading and trailing edges in the manner previously described. The above detector system is not claimed herein but is the subject of a separate Patent No. 2,766,945 above-mentioned.

When the circuit flowing through the lower detector station is completed upon the passage of a workpiece, the solenoid 174 is activated and the arm 160 is brought into engagement with the rotating member 120 causing the arm to be rotated in a clockwise direction (Fig. 6). When the leading edge of a workpiece is properly detected by the upper station U and the solenoid 194 is activated 1 to 4 pins 208 are displaced inwardly, the first or leading pin being representative of the leading edge of the workpiece. The pins thereupon travel in a counter-clockwise direction (Fig. 6) towards the arm 160. The relation of the pins and the arm when they first approach each other is shown in Fig. 13 with their relative rates being indicated by the arrows. The leading pin designated P strikes a camming surface 222 formed on the end of the arm 160 thereby raising the arm 160 about the pivot point 162 so that the pin P travels for a short time around a flat 224 as is seen in Fig. 14. This initial raising of the arm 160 causes the parts to assume the relationship shown in Fig. 19 in which position the member 146 has reached the maximum limit of rotation and the flanged member 150 has likewise been raised its maximum amount thereby completing the circuit through the switch 186 causing the relay K1 to close and activate the solenoid S thereby initiating the above-mentioned hydraulic circuit to cause the arm 38 to be oscillated in proper time relationship, thus stacking the workpieces W equally on either side of the horse H.

During the first upward movement of the arm 160 it continues to be driven by the member 120 due to the fact that the pawl 164 is continued in engagement with the member 120 by the action of the spring 172 assuming the relationship shown in Fig. 18 with the pin 168 engaging the upper end of the slot 170. Continued relative movement of the arm 160 and the pin P causes the pin P to strike the cam surface 225 as is seen in Fig. 13 thereby raising the arm 160 to the position shown in Figs. 15 and 20. The tooth 156 is now acting on the underside of the tooth 158 and under the action of the spring 152 positively holds the arm 160 in its disengaged position as seen in Fig. 8. At this point the pins 208 continue rotating but the arm 160 momentarily has no motion until it starts to return to its original position under the action of the spring 134.

It is of great importance that all of the displaced pins 208 be returned to their original or outer positions as seen in Fig. 8 before a second signal, caused by the passage of the leading edge of a workpiece beneath the upper detector station, activates the solenoid 174 thereby causing the arm 160 again to become engaged with the member 120. Cam surfaces 229, 231 are provided on the end of the arm 160 for that purpose. During the rising motion of the member 160 caused by the cam surface 222 and 226, pins 208, which are behind the leading pin P, are returned to their original position by the surface 229 the action of which is indicated in Fig. 16. After the arm 160 has been disengaged by the cam surface 226 it rotates in the same direction as the pins P under the action of the torsion spring 134 but at a greater rate of speed. Figs. 15 and 22 show the arm 160 at the moment it has been disengaged from the member 120 and before it has started its reversed rotation under the action of said torsion spring. Fig. 22 shows that the cam surface 231 is located so that as the arm 160 attains a speed greater than that of the pins 208 said surface will erase or displace these pins to their outer position. In a case where the arm 160 travels only a short distance and the surface 231 is ineffective a further cam surface on the safety arm 226 returns the displaced pins (Fig. 6).

Safety means are provided to prevent a switch 186 from cycling the machine as one or more of the pins 208 are inadvertently displaced inwardly. The surface 231 formed on the arm 160 is in the path of travel of the pins 208 in its upper position as seen in Fig. 8. The pins will automatically be canceled or are returned to their original position if inadvertently displaced. A further safety provision is provided for the case where the arm 160 might inadvertently be engaged with the member 120. The camming surface 230 on the arm 226 automatically disengages the timing arm 160 where no pin 208 is displaced and it is returned to its starting position under the action of the torsion spring 134.

Having thus described my invention, what I claim as new and desire to secure by Letters Patent of the United States is:

1. In a work treating machine having conveyor means and work treating means, a control system comprising means for detecting the passage of the leading and trailing edges of a conveyed workpiece, a control mechanism having first and second members which are mounted for rotation in opposite directions about a common axis, said first member having a series of displaceable pins mounted therein, a third member mounted for rotation about said common axis and arranged to be intermittently connected to said second member and rotated thereby in response to detection of one edge of a conveyed workpiece, means for displacing at least one pin into the path of travel of said third member in response to detection of the other edge of the conveyed workpiece, means for actuating said work treating means including an electrical switch located in a position fixed relatively to and remote from the path of movement of said third member, cam means formed on said third member which cooperate with said displaced pin to disengage said third member from said second member, and means responsive to an intermediate portion of the disengaging movement of said third member for closing said electrical switch, said cam means being adapted to maintain said third member in said intermediate portion of its disengaging movement for a finite period.

2. In a work treating machine having conveyor means and work treating means, a control system comprising means for detecting the passage of the leading and trailing edges of a conveyed workpiece, a control mechanism having first and second members which are mounted for rotation in opposite directions about a common axis, said first member having a series of displaceable pins mounted therein, said second member having a series of teeth formed thereon, a third member mounted for rotation about said common axis and having a tooth which is adapted to engage the teeth of said second member, means for moving said third member between engaged and disengaged positions with respect to said second member in response to detection of one edge of a conveyed workpiece and means for displacing at least one pin into the path of travel of said third member in response to detection of the other edge of the conveyed workpiece, means for actuating said work treating means including an electrical switch located in a position fixed relatively to and remote from the path of movement of said third member, cam means formed in said third member which cooperate with said displaced pin to disengage said third member from said second member, and means responsive to an intermediate portion of the disengaging movement of said third member for closing said electrical switch, said cam means being adapted to maintain said third member in said intermediate portion of its disengaging movement for a finite period.

3. In a work treating machine having conveyor means and work treating means; a control system comprising means for detecting the passage of the leading and trailing edges of a conveyed workpiece, a control mechanism having a pin wheel and a ratchet wheel which are mounted for rotation in opposite directions about a common vertical axis, said pin wheel having a series of displaceable pins mounted with their axes radial of the pin wheel, a control arm having a start position also mounted for rotation about the common axis and pivotally mounted for movement between engaged and disengaged positions with respect to the ratchet wheel, a resiliently mounted tooth carried by the control arm which is adapted to engage the teeth of the ratchet wheel in engaged position, a bell crank which is movable to an operating position in response to movement of the control arm toward disengaged position, means for causing the control arm to engage said ratchet wheel in response to the detection of one edge of a conveyed workpiece, means for displacing at least one pin into the path of travel of said control arm in response to detection of the other edge of the workpiece, means for actuating said work treating means including an electrical switch located in a position fixed relatively to and remote from the path of travel of said control arm, means for closing said switch in response to movement of the bell crank to its operating position, cam surfaces formed on said control arm which cooperate with a displaced pin first to pivot the control arm toward its disengaged position and the bell crank to its operating position while the resilient means maintains the tooth in engagement with the ratchet wheel so that the switch is closed for a finite period of time and thereafter to disengage the control arm from the ratchet wheel, and means for returning the control arm to its starting position.

4. The device defined in claim 3 in which the means for closing the electrical switch is ineffective during movement of the control arm while the control arm is in its starting position.

References Cited in the file of this patent

UNITED STATES PATENTS

| | | |
|---|---|---|
| 955,221 | Stilwell | Apr. 19, 1910 |
| 2,034,040 | Johnson | Mar. 17, 1936 |
| 2,374,779 | Preston | May 1, 1945 |